US012664256B2

(12) United States Patent
Fox et al.

(10) Patent No.: US 12,664,256 B2
(45) Date of Patent: Jun. 23, 2026

(54) SECURING PROGRAMMATICALLY-GENERATED CODE

(71) Applicant: INTERNATIONAL BUSINESS MACHINES CORPORATION, Armonk, NY (US)

(72) Inventors: Jeremy R. Fox, Georgetown, TX (US); Logan Bailey, Atlanta, GA (US); Zachary Augustus Silverstein, Georgetown, TX (US); Suman Patra, Raritan, NJ (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 18/953,612

(22) Filed: Nov. 20, 2024

(65) Prior Publication Data

US 2026/0141053 A1 May 21, 2026

(51) Int. Cl.
| | |
|---|---|
| *G06F 21/53* | (2013.01) |
| *G06F 8/35* | (2018.01) |
| *G06F 21/57* | (2013.01) |
| *G06N 3/0475* | (2023.01) |

(52) U.S. Cl.
CPC ............... *G06F 21/53* (2013.01); *G06F 8/35* (2013.01); *G06F 21/577* (2013.01); *G06N 3/0475* (2023.01); *G06F 2221/033* (2013.01)

(58) Field of Classification Search
None
See application file for complete search history.

(56) References Cited

U.S. PATENT DOCUMENTS

| | | | |
|---|---|---|---|
| 2024/0061937 A1* | 2/2024 | Camp | ................... G06F 40/237 |
| 2024/0119140 A1 | 4/2024 | Crabtree et al. | |

(Continued)

FOREIGN PATENT DOCUMENTS

CN          117234659 A          12/2023

OTHER PUBLICATIONS

"IBM Watson to Watson X", IBM, Printed from the Internet on Aug. 15, 2024, 12 pps., < https://www.ibm.com/watson>.

(Continued)

*Primary Examiner* — Nelson S. Giddins
(74) *Attorney, Agent, or Firm* — Seed Intellectual Property Law Group LLP

(57) ABSTRACT

A computer-implemented method for training a large language model (LLM) on a plurality of programming languages to recognize common coding patterns and generating, using the trained LLM, software code based on user-defined inputs. The method further includes analyzing the generated software code to identify destructive code and determining a reversal of the generated software code from a current state to a previous state is required based on the destructive code. Responsive to the determining that a reversal is required, the method may include running the generated software code comprising the destructive code in a controlled and isolated environment and providing a user with a reversal function that causes the generated software code to revert from the current state to the previous state. The method further includes executing the generated software code.

20 Claims, 4 Drawing Sheets

(56)  References Cited

U.S. PATENT DOCUMENTS

2025/0086270 A1*  3/2025  Palanki ............. G06Q 10/0875
2025/0217479 A1*  7/2025  Palanki ................. G06N 20/20

OTHER PUBLICATIONS

Chen et al., "Evaluating Large Language Models Trained on Code",
Jul. 14, 2021, 35 pps., <https://arxiv.org/pdf/2107.03374.pdf>.
Feng et al., "CodeBERT: A Pre-Trained Model for Programming
and Natural Languages", Sep. 18, 2020, <https://arxiv.org/pdf/2002.
08155.pdf? >.
Kmecl, "CodeGPT: write and improve code using AI", Last updated
Feb. 3, 2023, Visual Studio/Marketplace, 7 pps., <https://marketplace.
visualstudio.com/items?itemName=timkmecl.codegpt3 >.
Li et al., "Competition-Level Code Generation with AlphaCode",
Deep Mind, Mar. 16, 2022, 74 pps., <https://arxiv.org/pdf/2203.
07814.pdf? >.
Shojaee et al., "Execution-based Code Generation using Deep
Reinforcement Learning", Published in Transactions on Machine
Learning Research Jul. 2023, 26 pps., <https://arxiv.org/pdf/2301.
13816.pdf >.

* cited by examiner

100 ⬎

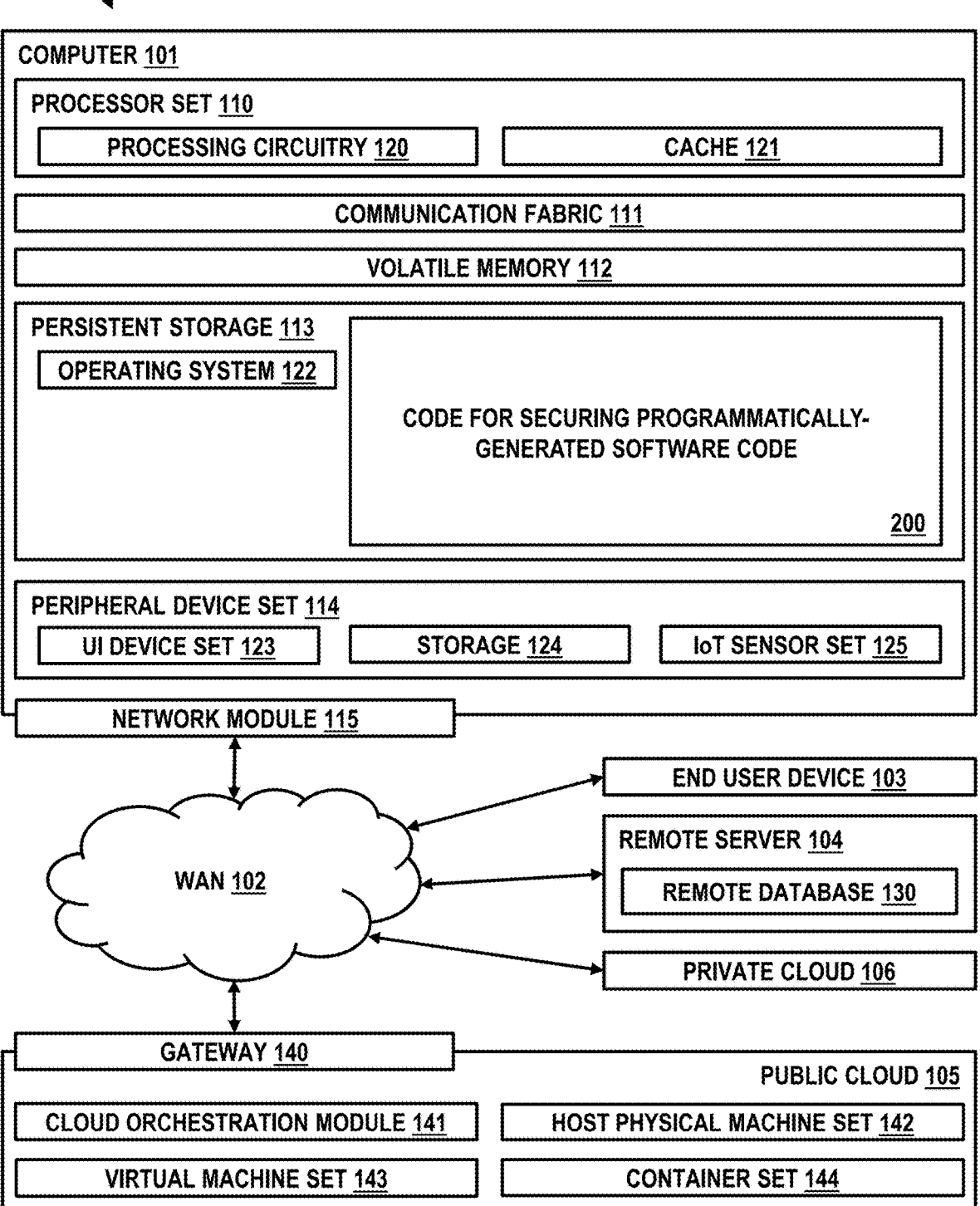

COMPUTER 101

PROCESSOR SET 110

PROCESSING CIRCUITRY 120  CACHE 121

COMMUNICATION FABRIC 111

VOLATILE MEMORY 112

PERSISTENT STORAGE 113

OPERATING SYSTEM 122

CODE FOR SECURING PROGRAMMATICALLY-
GENERATED SOFTWARE CODE

200

PERIPHERAL DEVICE SET 114

UI DEVICE SET 123  STORAGE 124  IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141  HOST PHYSICAL MACHINE SET 142

VIRTUAL MACHINE SET 143  CONTAINER SET 144

FIG. 1

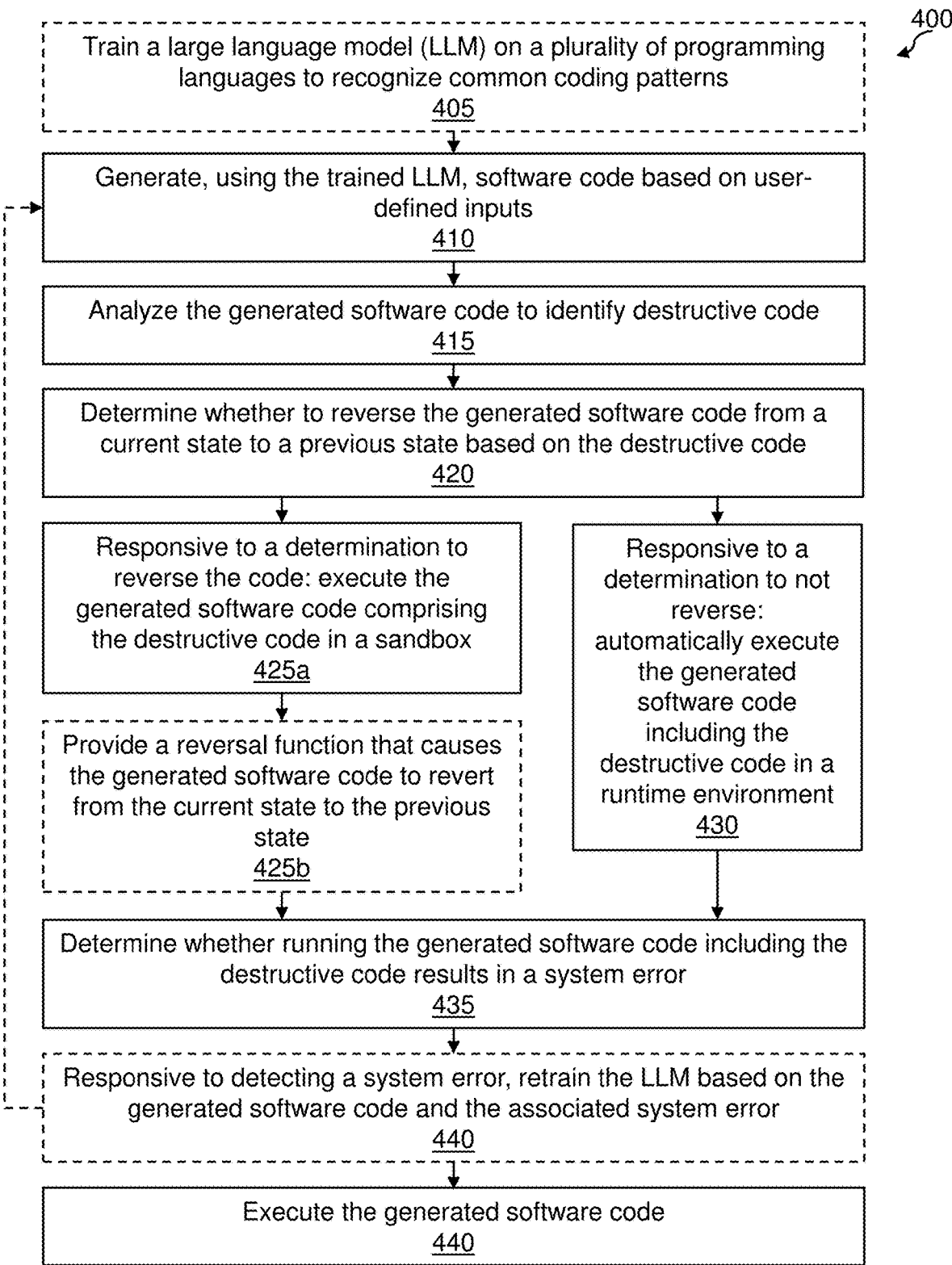

400

Train a large language model (LLM) on a plurality of programming languages to recognize common coding patterns
405

Generate, using the trained LLM, software code based on user-defined inputs
410

Analyze the generated software code to identify destructive code
415

Determine whether to reverse the generated software code from a current state to a previous state based on the destructive code
420

Responsive to a determination to reverse the code: execute the generated software code comprising the destructive code in a sandbox
425a Responsive to a determination to not reverse: automatically execute the generated software code including the destructive code in a runtime environment
430

Provide a reversal function that causes the generated software code to revert from the current state to the previous state
425b Determine whether running the generated software code including the destructive code results in a system error
435

Responsive to detecting a system error, retrain the LLM based on the generated software code and the associated system error
440

Execute the generated software code
440

FIG. 4

SECURING PROGRAMMATICALLY-GENERATED CODE

BACKGROUND

Aspects of the present invention relate generally to methods, systems, and computer program products for securing programmatically-generated code.

Large Language Models (LLMs) are increasingly used to generate source code by leveraging their ability to understand and generate natural language and programming languages. LLMs are trained on vast datasets that include human language and source code from various programming languages, which enables LLMs to perform code generation tasks.

Security in source code used for commerce-based transactions is used to protect sensitive financial and personal data from theft, fraud, and unauthorized access.

SUMMARY

In a first aspect of the present invention, there is a computer-implemented method including: first aspect of the present invention, there is a computer-implemented method including: training, by a processor set, a large language model (LLM) on a plurality of programming languages to recognize common coding patterns; generating, by the processor set using the trained LLM, software code based on user-defined inputs; analyzing, by the processor set, the generated software code to identify destructive code; determining, by the processor set, a reversal of the generated software code from a current state to a previous state is required based on the destructive code; responsive to the determining that the reversal is required: running, by the processor set, the generated software code including the destructive code in a controlled and isolated environment; and providing, by the processor set, a user with a reversal function, that when executed by the user, causes the generated software code to revert from the current state to the previous state; and responsive to a determination that running the generated software code comprising the destructive code does not result in a system error, executing, by the processor set, the generated software code.

In another aspect of the present invention, there is a computer program product including one or more computer-readable storage media; and program instructions stored on the one or more computer-readable storage media to perform operations. The operations include: training a large language model (LLM) on a plurality of programming languages to recognize common coding patterns; generating, using the trained LLM, software code based on user-defined inputs; analyzing the generated software code to identify destructive code; determining a reversal of the generated software code from a current state to a previous state is required based on the destructive code; responsive to the determining that the reversal is required: running the generated software code including the destructive code in a controlled and isolated environment; and providing a user with a reversal function, that when executed by the user, causes the generated software code to revert from the current state to the previous state; and responsive to a determination that running the generated software code comprising the destructive code does not result in a system error, executing the generated software code.

In another aspect of the present invention, there is a system including a processor set, one or more computer readable storage media, and program instructions stored on the one or more computer-readable storage media to cause the processor set to perform operations. The operations include: training a large language model (LLM) on a plurality of programming languages to recognize common coding patterns; generating, using the trained LLM, software code based on user-defined inputs; analyzing the generated software code to identify destructive code; determining a reversal of the generated software code from a current state to a previous state is required based on the destructive code; responsive to the determining that the reversal is required: running the generated software code including the destructive code in a controlled and isolated environment; and providing a user with a reversal function, that when executed by the user, causes the generated software code to revert from the current state to the previous state; determining that running the generated software code including the destructive code results in a system error; and responsive to a determination that running the generated software code comprising the destructive code does not result in a system error, executing the generated software code.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 4 shows a flowchart of an exemplary method in accordance with aspects of the present invention.

DETAILED DESCRIPTION

Figure 2:
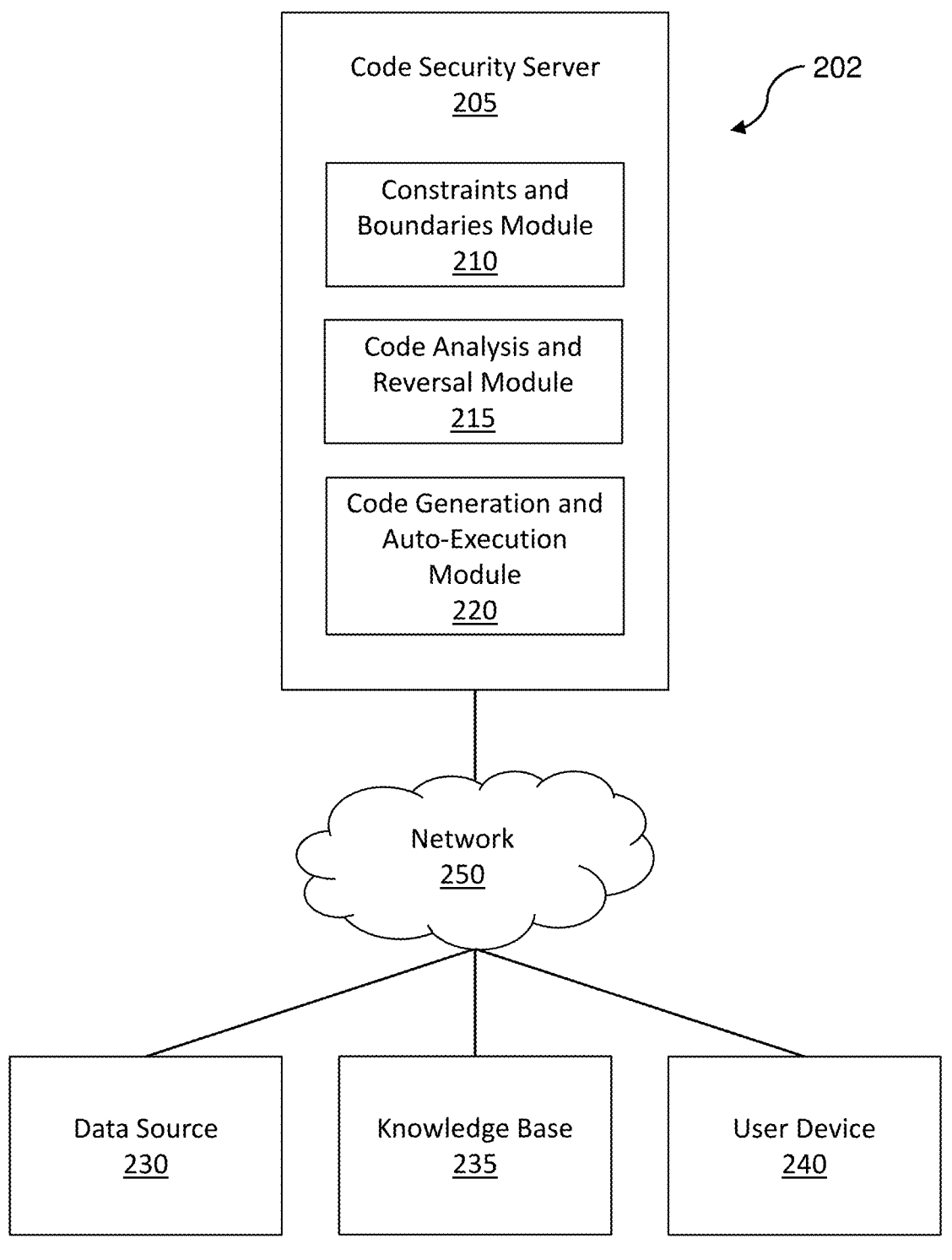
FIG. 2 shows a block diagram of an exemplary environment in accordance with aspects of the present invention.

Aspects of the present invention relate generally to methods, systems, and computer program products for securing programmatically generated code for programs used in commerce-based transactions and, more particularly, to large language model (LLM) generated code that is secure against malicious attacks and can be used to perform commerce-based transactions, such as online payments. As used herein, an LLM is an advanced artificial intelligence system trained on vast amounts of text data to understand and generate human-like language for various tasks. According to aspects of the present invention, the LLMs used and described herein may include general-purpose LLMs, task-specific LLMs that are fine-tuned for a specific task like coding assistance or software code generation, and/or retrieval-augmented LLMs, which combine model-generated knowledge with external data sources or databases. In embodiments, the methods, systems, and computer program products may use any combination of the foregoing LLMs to perform the disclosed tasks, features, and/or functions. Furthermore, in embodiments, the LLMs described herein are trained on a wide range of programming languages and coding patterns, enabling it to provide accurate and efficient code suggestions to a user. For example, the LLM engine can recognize common coding patterns such as loops, conditional statements, and function declarations. This allows the trained LLM to provide users with helpful suggestions and automate repetitive tasks, making the coding process faster and more efficient.

According to an aspect of the present invention, there is a computer-implemented method, system, and computer program product for safely executing LLM generated software code. The method, system, and computer program product include: training an LLM on a plurality of programming languages to recognize common coding patterns, where the coding patterns include loops, conditionals, and function declarations; configuring the LLM based on user defined inputs and constraints, where the user defined constraints include reserved keywords, system constraints, protected files or folders, and known vulnerabilities that should be avoided when generating software code by the trained LLM; generating, using the trained LLM, the software code based on the user defined inputs and constraints; analyzing the generated software code to identify destructive code; determining, based on the identified destructive code, whether a reversal of the generated software code from a current state to a previous state is required; responsive to a determination that a reversal is required, (a) running the generated software code including the destructive code in a sandbox, and (b) providing a user with a reversal function, that when executed by the user, causes the generated software code to revert from the current state to the previous state; and automatically executing the generated software code including the destructive code in a runtime environment in response to a determination that a reversal is not required.

As used herein, destructive code refers to code that, when executed, can cause harm to a system or lead to unintended errors. In this context, destructive code can result in a system error when run within a sandbox and/or runtime environment. In embodiments, destructive code may alter system states, cause failures, and/or introduce risks that need to be managed or mitigated.

In embodiments, the computer-implemented method, system, and computer program product further includes determining whether running the generated software code including the destructive code in the sandbox results in a system error; and retraining the LLM based on the generated software code including the destructive code and the associated system error in response to detecting a system error.

In embodiments, the determining whether a reversal of the generated software code from the current state to the previous state is required, as described above, is also determined based on an identified risk level associated with executing the generated code including the destructive code in the runtime environment.

Implementations of the present invention are necessarily rooted in computer technology. For example, the steps of training a large language model (LLM) on a plurality of programming languages to recognize common coding patterns; generating, using the trained LLM, software code based on user-defined inputs; analyzing, the generated software code to identify destructive code; determining a reversal of the generated software code from a current state to a previous state is not required based on the destructive code; and executing the generated software code, are computer-based and cannot be performed in the human mind.

In existing technologies, LLMs are increasingly being used for code generation and they are providing tremendous opportunities for software developers and non-software developers to execute and run code. However, there are problems that can occur when using LLMs to generate source code. For example, individuals and/or programmers may not fully understand implications of an action that may be included in LLM generated code which may result in serious issues when the program is executed. For example, LLM-generated code may result in security vulnerabilities. This means LLMs may generate code that lacks proper security measures, such as insufficient input validation, weak encryption, or improper error handling, potentially exposing applications to cyberattacks like structured query language (SQL) injection, cross-site scripting (XSS), or data breaches. LLM-generated code may result in security vulnerabilities data breaches. LLM-generated code may result in system failures, which means LLM-generated code can lead to system failures if it contains logical errors, improper handling of edge cases, or lacks robust error handling, causing crashes or unexpected behavior in critical applications. Using LLM-generated code may also lead to legal and compliance risks. For example, LLMs may unintentionally generate code that violates licensing agreements, regulations, intellectual property rights, or fails to comply with industry standards (e.g., payment card industry data security standard (PCI DSS) for financial transactions), potentially resulting in legal costs or penalties and/or non-compliance issues. Each of the foregoing issues (i.e., security vulnerabilities, system failures, and legal and compliance risks) are potential risks when generating code using the described existing technology. Each of these risks may have a significant, even catastrophic, impact on a project, organization, business, and more.

According to aspects of the present invention, a user may set associated LLM constraints and boundaries, including reserved keywords, system constraints, and known vulnerabilities, to ensure that the generated code meets their specific requirements. By setting these constraints and boundaries, the user can ensure that the generated code meets their specific requirements and aligns with their desired outcome while avoiding any potential issues or risks. Furthermore, according to aspects of the present invention, a user may designate any cases or allowed destructive actions with a reversal flag, which indicates whether the generated code can be undone or reversed if necessary. Designating cases or allowed destructive actions with a reversal flag provides an added layer of control and flexibility for the user. It allows them to experiment with potentially risky code changes or perform actions that may have irreversible consequences, while still having the option to revert to a previous state, if needed. This not only mitigates the fear of making mistakes or causing unintended damage, but also encourages innovation and exploration in the coding process.

According to aspects of the present invention, if the LLM generated code fails and if a resolution is needed, the system prompts the code and error back to the LLM engine requesting resolution. This allows the module to learn from previous errors and improve the generated code in future iterations. By analyzing and learning from previous errors, the system can continuously improve the quality of the generated code in future iterations. It uses the feedback from the LLM engine to identify patterns and common pitfalls, allowing it to fine-tune its algorithms and avoid making similar mistakes in the future. This iterative process ensures that the module becomes more accurate and reliable over time, ultimately enhancing its ability to generate code that is efficient, effective, and less prone to errors.

Embodiments and aspects of the present invention provide systems and methods that improve and advance the technology and the functioning of a computer in a specific and practical application. In other words, the methods, systems, and computer program products described herein improve the functioning of a computer (enabling computers to operate more efficiently, accurately, and securely) by providing LLM generated code that avoids excessive memory usage, excessive execution times, (in)compatibility issues, platform-specific issues, and concurrency, and improves the technologies of software programmatically generated source code by providing LLM generated code that is proven to be secure against certain malicious attacks and proven to prevent destructive actions.

It should be understood that, to the extent implementations of the present invention collect, store, or employ personal information provided by, or obtained from, individuals (for example, any personal or business information collected or required to process commerce-based transactions, such as online payments), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks/operations may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, code for securing programmatically-generated software code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of exemplary environment 202 in accordance with aspects of the present invention. In embodiments, environment 202 includes code security server 205, data sources 230, knowledge base 235, user device 240, and network 250.

Code security server 205 may comprise one or more instances of computer 101 of FIG. 1. In another example, code security server 205 may comprise one or more virtual machines or containers running on one or more instances of computer 101 of FIG. 1. In embodiments, code security server 205 communicates with data sources 230, knowledge base 235, and user device 240 via network 250, which may comprise WAN 102 of FIG. 1. In embodiments, data sources 230 comprise one or more data sources each comprising an instance of remote database 130 and/or remote server 104 of FIG. 1. In embodiments, knowledge base 235 comprises one or more knowledge bases each comprising an instance of remote database 130 and/or remote server 104 of FIG. 1. In embodiments, user device 240 comprises an instance of end user device 103 of FIG. 1. There may be plural different instances of user device 240 including, for example, user-accessible servers and personal computing devices. The different instances of user device 240 may be used by different users and evaluators, respectively.

In embodiments, code security server 205 of FIG. 2 comprises constraints and boundaries module 210, code analysis and reversal module 215, and code generation and auto-execution module 220, each of which may comprise modules of the code for securing programmatically-generated software code of block 200 of FIG. 1. Such modules may include routines, programs, objects, components, logic, data structures, and so on that perform a particular task (or tasks) or implement a particular data type (or types) that the code of block 200 uses to carry out the functions and/or methodologies of embodiments of the present invention as described herein. These modules of the code of block 200 are executable by computer 101 of FIG. 1 (e.g., processing circuitry 120 of FIG. 1) to perform the inventive methods as described herein. Code security server 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, code security server 205 is configured to request and/or receive consent of the individuals to use the LLM engine. For example, code security server 205 may be configured to perform an "opt-in" or "opt-out" process. In embodiments, the user may "opt-in" or "opt-out" via a verbal consent, written consent, and/or by selecting a graphical user interface (GUI) button indicating the user's consent to "opt-in" or "opt-out" via user device 240. As used herein, the LLM engine is a system powered by a large-scale artificial intelligence model that processes and understands natural language inputs. In embodiments the LLM engine uses advanced machine learning techniques, particularly deep learning, to generate human-like text and/or software code. In embodiments, the LLM engine interprets natural language inputs and translates them into actionable commands or structured data, which can then be executed by a local agent. In embodiments, the LLM engine is located at code security server 205.

Code security server 205 may be further configured to integrate the LLM engine and a local agent. In embodiments, code security server 205 integrates the LLM engine and a local agent by creating an API or middleware that forwards natural language inputs to the LLM for processing. In embodiments, the LLM may interpret the input and send actionable commands or structured data to the local agent. In such embodiments, the local agent may execute tasks based on the LLM's output.

In accordance with aspects of the present invention, constraints and boundaries module 210 is configured to obtain and/or receive user-defined inputs. As used herein, user-defined inputs may include, for example, reserved keywords, system constraints, known vulnerabilities and/or any other inputs that constrain the limits of the LLM. Reserved keywords are predefined words in programming languages that have special meanings. Using the reserved keywords incorrectly can lead to syntax errors or unexpected behavior. In other words, misuse of reserved keywords can lead to confusion in code generation and functional errors. For example, without a user-defined reserved keyword, an LLM might suggest a variable name that clashes with a keyword. In another example, if the LLM engine is implemented in a bidding type of application, the application may have application-specific keywords that would have meaning within the application and/or that would trigger application-specific functions, including different types of bidding functions. In this example, the user-input would include reserved keywords to specifically avoid the application-specific keywords that have meaning within the application and/or that trigger application-specific functions. In embodiments, the reserved keywords are stored in a corpus (e.g., knowledge base 235 of FIG. 2) for later use or retrieval. In embodiments additional corpuses may be grown, collected, and stored for certain type of businesses or areas as more information becomes available and is stored within the corpuses.

Code security server 205 may be further configured to generate, update, and manage a knowledge corpus (e.g., knowledge base 235 of FIG. 2) that is specific to the usage criteria to catalog both positive and negative results. In such embodiments, code security server 205 generates and updates a knowledge corpus specific to the usage criteria by cataloging both positive and negative results. Code security server 205 analyzes and learns from previous errors, using the feedback from the LLM engine to identify patterns and common pitfalls. This iterative process allows the module to continuously improve the quality of the generated code, making it more accurate, reliable, and less prone to errors over time.

As used herein, system constraints may include memory usage, execution time, compatibility issues, platform-specific constraints, concurrency, and more. For example, generated code has a potential to consume too much memory if it is inefficient (e.g., generating large arrays or recursive functions without proper termination, etc.). Even efficient code being performed by an LLM on a local machine may consume too much memory. Such scenarios result in crashes or excessive resource consumption. Thus, a user may set memory usage constraints to prevent the generated software code from consuming too much memory. Inefficient algorithms or unoptimized loops have a potential to slow performance. Therefore, a user may set execution time constraints (e.g., via user device 240) to reduce and/or eliminate inefficient algorithms or unoptimized loops. Generated code that does not consider different versions of a programming language, libraries, or APIs, has a potential for causing compatibility issues. Thus, a user may set compatibility constraints (e.g., via user device 240) so that the generated software code avoids incompatibility issues. In other words, a user can specify reserved keywords that should not be used, system constraints that the code must adhere to, and known vulnerabilities that need to be avoided.

By setting these constraints and boundaries, the user can ensure that the generated code meets their specific requirements and aligns with their desired outcome while avoiding any potential issues or risks. For example, without proper constraints, when generating code, an LLM might introduce vulnerabilities, especially if it is not trained on security implications. Thus, a user may input constraints to protect from known vulnerabilities and/or known solutions for the vulnerabilities. For example, a user may input constraints to protect from injection attacks, cross-site scripting (XSS), buffer overflow, insecure cryptography, hardcoded secrets, improper access control, race conditions, and more. In embodiments, the constraints may provide solutions for each of the known vulnerabilities to act as guideposts for the generated software code such that the LLM can avoid generating software code to avoid known vulnerabilities.

In embodiments, constraints and boundaries module 210 is further configured to designate any cases or allowed destructive actions with a reversal flag. In embodiments, the reversal flag designating any cases or allowed destructive actions may be set by the user, via a user input (e.g., via user device 240). As used herein, allowed destructive action refers to operations that modify or delete data or system states but are deemed acceptable, safe, and intentional based on the situation. In existing technologies, destructive actions can lead to irreversible changes. According to aspects of the instant invention, a user can set reversal flags so the code can be reversed later, if necessary. Some allowed destructive actions may include, for example, file deletion in temporary directories, database record deletion, overwriting files, terminating processes, clearing caches, uninstalling applications, revoking permissions, and more. Designating cases or allowed destructive actions with a reversal flag provides an added layer of control and flexibility for a user. It allows the user the latitude to experiment with potentially risky code changes or perform actions that may have irreversible consequences, while still having the option to revert to a previous state, if needed. This not only mitigates the fear of making mistakes or causing unintended damage, but also encourages innovation and exploration in the coding process.

In embodiments, the risk of using the destructive code (e.g., allowed destructive actions) may be quantified. For example, constraints and boundaries module 210 may be configured to quantify (e.g., score) the risk(s) of executing the destructive code and derive actions being considered within a risk categorization format. In such embodiments, the derived actions and/or risk categorization may be weighted. In such embodiments, derived actions and/or specific risk categories may have a relatively higher risk or may be related to relatively higher-risk activities. These higher risk actions, categories, and/or activities may be given a relatively higher weight and may ultimately lead to a higher risk score. In embodiments, the score may be compared against a threshold. If the risk score exceeds a threshold, constraints and boundaries module 210 may require a user input (e.g., via user device 240) before allowing any further processing of the generated software code. In other embodiments, if the risk score exceeds a threshold, constraints and boundaries module 210 may reject the generated software code and provide the feedback to the LLM for generating additional (or alternative) software code.

In accordance with aspects of the present invention, code analysis and reversal module 215 is configured to process the LLM generated software code searching for destructiveness and reversal states. In embodiments, code analysis and reversal module 215 may be configured to identify destructive operations like file deletions, database alterations, or process terminations by scanning the generated software code for critical commands and functions. In embodiments, code analysis and reversal module 215 may be configured to detect the presence of a reversal flag and/or the presence of safeguards such as confirmation prompts, backups, or error handling mechanisms that allow for safe reversal.

In embodiments, code analysis and reversal module 215 may be further configured to determine, based on the destructiveness and reversal state findings, whether a software code reversal is needed. For example, in embodiments, code analysis and reversal module 215 may determine that a reversal is needed when the analysis detects that the LLM generated software code performs unintended actions—such as deleting the wrong files, altering incorrect database records, or terminating necessary processes—reversal would be essential to restore the system to a prior, stable state. Reversal may also be needed if the code includes destructive actions without built-in rollback mechanisms (e.g., no backups, no transaction management), such a reversal would recover lost data or restore configurations. In another example, reversal may be needed if executing the generated code results in a failure, system crash, or severe performance degradation. In such instances, a reversal would return the system to normal operations and prevent further damage.

In embodiments where a reversal is needed, as determined by code analysis and reversal module 215, code generation and auto-execution module 220 is configured to generate and execute destructive code and/or provide a manual reversal function to execute based on a user input. In such embodiments, the destructive code may be executed in a controlled and isolated environment designed to safely run and test code without affecting the host system or other environments (e.g., a sandbox). In such embodiments, the controlled and isolated environment restricts the code's access to system resources, such as files, network, and processes, to prevent unintended or malicious behavior from impacting the wider system.

In embodiments where a reversal is not needed, as determined by code analysis and reversal module 215, code generation and auto-execution module 220 may be further configured to generate and auto-execute the LLM generated software code in a predefined runtime environment using environment (env) variables (e.g., key value pairs) and or path variables to runtimes.

Figure 3:
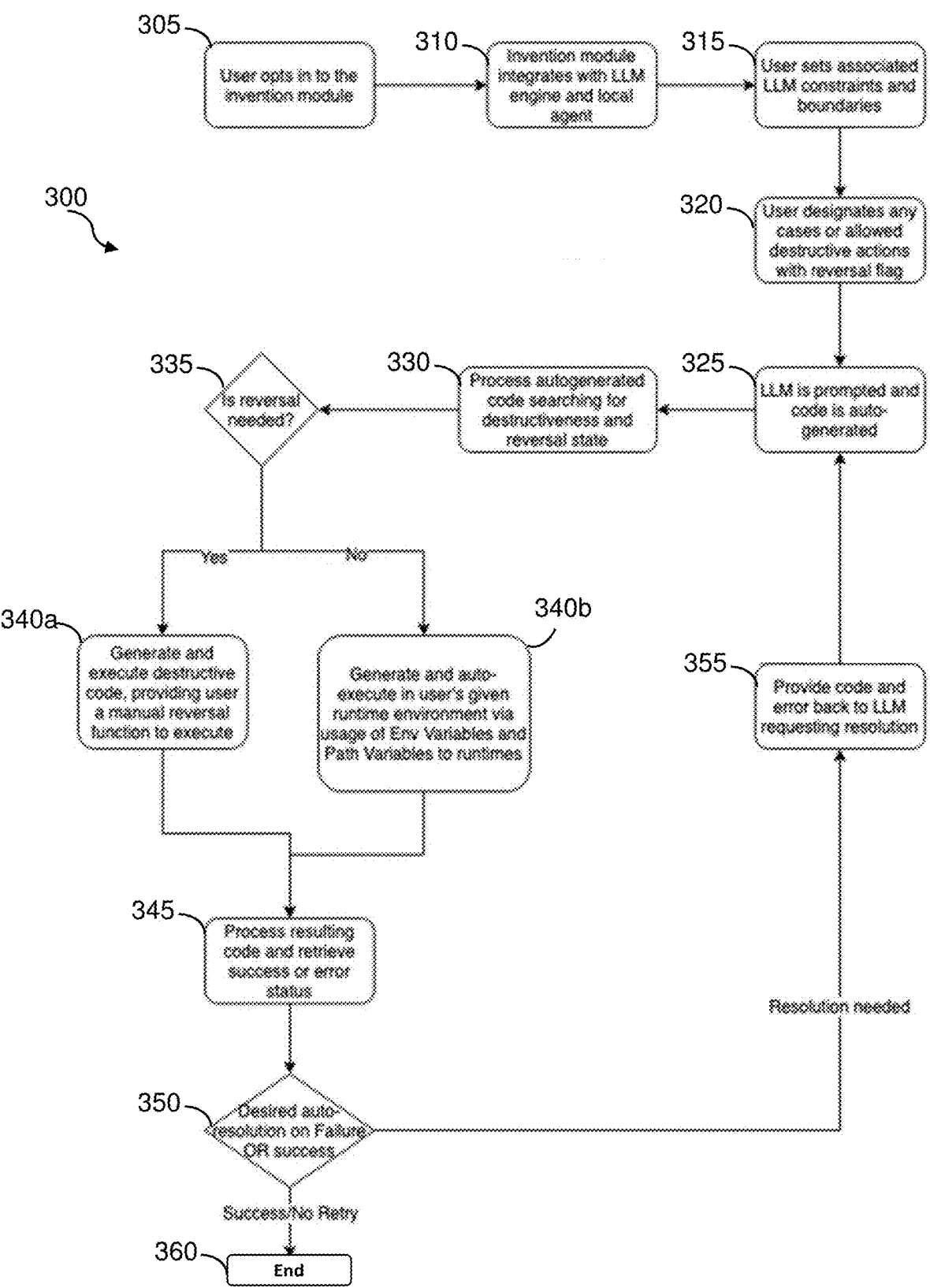
FIG. 3 shows a flowchart of an exemplary method in accordance with aspects of the present invention.

FIG. 3 shows a flowchart of exemplary method 300 in accordance with aspects of the present invention. Operations of the method may be carried out in the environment of FIG. 2 and are described with reference to elements depicted in FIG. 2. It should be noted that, for simplicity, FIG. 3 illustrates a possible path for one set of autogenerated code. However, in embodiments, the flowchart of FIG. 3 may be applied to multiple sets, lines, and/or modules of code at any given time. In such embodiments, each of the sets, lines, and/or modules of code may be processed in series or in parallel by one or more processors on one or more servers (e.g., one or more instances of code security server 205 of FIG. 2).

At operation 305 of FIG. 3, code security server 205 is configured to request and/or receive consent of the individuals to use the LLM generation engine. For example, as provided above, code security server 205 may be configured to perform an "opt-in" or "opt-out" process. In embodiments, the user may "opt-in" or "opt-out" via a verbal consent, written consent, and/or by selecting a graphical user interface (GUI) button indicating the user's consent to "opt-in" or "opt-out."

At operation 310, code security server 205 of FIG. 2 is configured to integrate the LLM engine and a local agent. In embodiments, code security server 205 integrates the LLM engine and a local agent by creating an API or middleware that forwards natural language inputs to the LLM for processing. In embodiments, the LLM may interpret the input and send actionable commands or structured data to the local agent. In such embodiments, the local agent may execute tasks based on the LLM's output. In this manner, the LLM engine will automatically execute code with non-destructive actions by communicating to the local agent residing on a user's machine (e.g., one or more instances of user device 240 of FIG. 2).

At operation 315, constraints and boundaries module 210 of FIG. 2 is configured to obtain and/or receive user-defined inputs. As provided above, user-defined inputs may include, for example, reserved keywords, system constraints, protected files or folders, known vulnerabilities (i.e., protecting from and/or avoiding known vulnerabilities) and/or any other inputs that constrain the limits of the LLM.

At operation 320, constraints and boundaries module 210 of FIG. 2 is configured to designate any cases or allowed destructive actions with a reversal flag. In embodiments, constraints and boundaries module 210 the reversal flag designating any cases or allowed destructive actions may be set by the user, via a user input. As provided above, allowed destructive action refers to operations that modify or delete data or system states but are deemed acceptable, safe, and intentional based on the situation. According to aspects of the instant invention, a user can set reversal flags so the code can be reversed later, if necessary. Some allowed destructive actions may include, for example, file deletion in temporary directories, database record deletion, overwriting files, terminating processes, clearing caches, uninstalling applications, revoking permissions, and more. In embodiments, the cases or allowed destructive actions may vary based on the subject matter and/or scope of the generated software code. In other words, code being generated for secure financial transaction (e.g., an ecommerce application) may have a different list of cases or allowed destructive actions that code being generated for a non-secure data transaction (e.g., public messages).

In embodiments, the reversal flag may be designated automatically by the LLM engine (i.e., code security server 205 of FIG. 2) based on an analysis of the user-inputs (e.g., reserved keywords, system constraints, protected files or folders, known vulnerabilities, and/or other constraints) and based on one or more goals or desired outcomes of the software code to be generated.

At operation 325, constraints and boundaries module 210 of FIG. 2 is configured to provide a prompt for the LLM and the LLM automatically generates and/or regenerates the software code. At operation 330, code analysis and reversal module 215 of FIG. 2 is configured to process the LLM generated software code searching for destructiveness and reversal states. In embodiments, code analysis and reversal module 215 may be configured to identify destructive operations like file deletions, database alterations, or process terminations by scanning the generated software code for critical commands and functions. In embodiments, code analysis and reversal module 215 may be configured to detect the presence of a reversal flag and/or the presence of safeguards such as confirmation prompts, backups, or error handling mechanisms that allow for safe reversal.

At operation 335, code analysis and reversal module 215 of FIG. 2 is configured to determine, based on the destructiveness and reversal state findings, whether a software code reversal is needed. For example, in embodiments, code analysis and reversal module 215 may determine that a reversal is needed when the analysis detects that the LLM generated software code performs unintended actions-such as deleting the wrong files, altering incorrect database records, or terminating necessary processes-reversal would be essential to restore the system to a prior, stable state. Reversal may also be needed if the code includes destructive actions without built-in rollback mechanisms (e.g., no back-ups, no transaction management), such a reversal would recover lost data or restore configurations. In another example, reversal may be needed if executing the generated code results in a failure, system crash, or severe performance degradation. In such instances, a reversal would return the system to normal operations and prevent further damage.

At operation 340*a*, where a reversal is needed, code generation and auto-execution module 220 of FIG. 2 is configured to generate and execute destructive code and/or provide a reversal function to execute based on a user input. In embodiments, the destructive code may be executed in a controlled and isolated environment designed to safely run and test code without affecting the host system or other environments (e.g., a sandbox). In such embodiments, the controlled and isolated environment restricts the code's access to system resources, such as files, network, and processes, to prevent unintended or malicious behavior from impacting the wider system. In embodiments, the reversal function to execute is provided to a user and the user manually initiates the execution of the reversal function. In other embodiments, the system may automatically initiate the execution of the reversal function without any user interaction.

At operation 340*b*, where a reversal is not needed, code generation and auto-execution module 220 of FIG. 2 is configured to generate and auto-execute the LLM generated software code in a predefined runtime environment using environment (env) variables (e.g., key value pairs) and or path variables to runtimes.

At operation 345, code generation and auto-execution module 220 of FIG. 2 is configured to process the software code resulting from the execution of operations 340*a* or 340*b*. In embodiments, the software code processing comprises determining and/or retrieving a success or error status. In embodiments, success is indicated if the code runs without issues and produces the expected result. In embodiments, errors might arise from various factors, such as failed code execution, issues with environment variables (e.g., incorrect key-value pairs), missing dependencies, incorrect file paths, or unintended interactions with system resources. These errors could lead to system crashes, incomplete execution, or incorrect outputs.

At operation 350, code generation and auto-execution module 220 of FIG. 2 is configured to determine whether there is a desired automatic resolution on a software code processing failure. In embodiments, automatic resolution for a software code processing failure involves the system identifying the error(s), reversing one or more changes made, and analyzing the adjusted code, such as corrected environment variables or dependencies. In embodiments, if the failure persists, the system may be configured to trigger a fail-safe mechanism, like alerting a user with detailed diagnostics and suggestions for manual intervention.

At operation 355, code security server 205 of FIG. 2 is configured to provide the software code, the error(s), and/or potential solutions for fixing or improving the software code back to the LLM as at least a portion of an LLM prompt, in accordance with operation 325. In embodiments, where there are multiple potential solutions for fixing or improving the software code, the potential solutions may be ranked in order of which solution may provide the greatest improvement to the overall functionality of the generated and/or regenerated software code. For example, if two destructibility issues and one reversibility issue caused the software code to fail, code security server 205 may rank the three issues in order of which error, if fixed, would improve the overall functionality of the software code. In embodiments, the issues may be ranked with respect to profitability, security, interoperability, or any other metric that may be used to evaluate the issues.

By providing the software code, the error(s), and/or potential solutions for fixing or improving the software code back to the LLM, this allows the LLM to analyze and potentially correct the issue(s) causing the error(s). In embodiments, the LLM prompt includes relevant details from the error and code execution, enabling the LLM to generate and/or regenerate adjustments and/or fixes for the failed software code. In embodiments, new software code is generated and/or regenerated by the LLM and the steps provided in operations 325-345 are iteratively performed until a successful status is achieved and/or obtained.

Furthermore, by analyzing and learning from previous errors, code security server 205 can continuously improve the quality of the LLM generated software code in future iterations. In other words, code security server 205 uses the feedback from the LLM engine to identify patterns and common pitfalls, allowing it to fine-tune its algorithms and avoid making similar mistakes in the future. This iterative process ensures that the LLM becomes more accurate and reliable over time, ultimately enhancing its ability to generate code that is efficient, effective, and less prone to errors.

At operation 360, the process ends and code security server 205 waits for any additional user input. In embodiments, code security server 205 is configured to automatically implement and/or perform the function of the code without human intervention. For example, if the LLM generated software code as generated for a specific platform to automatically send personalized marketing emails, text(s), or notification(s) to specific unique customers, upon a successful completion of the LLM software code generation, code security server 205 may automatically execute the software code to send the personalized marketing emails, text(s), or notification(s).

In embodiments, code security server 205 may be further configured to analyze the successful LLM generated software code and quantify a risk of the software code. For example, even though the LLM generated software code exceeded thresholds to be considered successful, code security server 205 may identify and/or quantify a level of risks to be considered in future iterations of the software code.

In embodiments, code security server 205 is configured to track the success or failure of the executed LLM generated code and use the resulting data to train and re-train the LLM to generate improved software code. Returning to the exemplary personalized marketing emails, text(s), or notification(s) described above, depending on the customer responses, the received and/or measured feedback is utilized to enhance future communications, leading to continuous improvement of the marketing messages and potential increase in sales. The LLM engine uses sophisticated algorithms to analyze customer purchasing history, browsing behavior, and demographic information. By leveraging this data, the LLM engine generates personalized messages tailored to each individual customer's preferences and interests. This ensures that the marketing communications are relevant and engaging, increasing the likelihood of a successful sales conversion.

FIG. 4 shows a flow diagram of an exemplary method 400 in accordance with aspects of the present invention. At least portions of environment 400 may be described with reference to some elements and actions depicted in FIGS. 2 and 3.

At operation 405, the system (e.g., an instance of code security server 205 of FIG. 2 and/or any of code security server 205's modules) may be optionally configured (as indicated by the dotted lines) to train an LLM on a plurality of programming languages to recognize common coding patterns. In other words, the LLMs may be trained on a wide range of programming languages and coding patterns, enabling it to provide accurate and efficient code suggestions to a user. For example, the LLM engine can recognize common coding patterns such as loops, conditional statements, and function declarations.

At operation 410, the system may be configured to generate, using the trained LLM, software code based on user-defined inputs. As described above, user-defined inputs may include, for example, reserved keywords, system constraints, protected files or folders, known vulnerabilities (i.e., protecting from and/or avoiding known vulnerabilities) and/or any other inputs that constrain the limits of the LLM. In embodiments, generating software code may be performed in accordance with operations 315-325 of FIG. 3.

At operation 415, the system may be configured to analyze the generated software code to identify destructive code. As described above, in embodiments, the system may identify destructive operations like file deletions, database alterations, and/or process terminations by scanning the generated software code for critical commands and functions. In embodiments, the analysis may be performed in accordance with operation 330 of FIG. 3.

At operation 420, the system may be configured to determine whether to reverse the generated software code from a current state to a previous state based on the identified destructive code. For example, in embodiments, code analysis and reversal module 215 may determine that a reversal is needed when the analysis detects that the LLM generated software code performs unintended actions-such as deleting the wrong files, altering incorrect database records, or terminating necessary processes-reversal would be essential to restore the system to a prior, stable state. Reversal may also be needed if the code includes destructive actions without built-in rollback mechanisms (e.g., no backups, no transaction management), such a reversal would recover lost data or restore configurations. In another example, reversal may be needed if executing the generated code results in a failure, system crash, or severe performance degradation. In such instances, a reversal would return the system to normal operations and prevent further damage. In embodiments, the determination is made in accordance with operation 335 of FIG. 3.

At operation 425a, responsive to a determination to reverse the generated software code, the system may be configured to execute (e.g., run) the generated software code comprising the destructive code in a sandbox. As used herein a sandbox is a controlled and isolated environment designed to safely run and test code without affecting the host system or other environments. In such embodiments, the controlled and isolated environment restricts the code's access to system resources, such as files, network, and processes, to prevent unintended or malicious behavior from impacting the wider system. In embodiments, executing the generated software code may be performed in accordance with operation 340a of FIG. 3.

At operation 425b, the system may be optionally configured to provide a reversal function that causes the generated software code to revert from the current state to the previous state. In embodiments, providing the reversal function may be performed in accordance with operation 340a of FIG. 3. In embodiments, the reversal function to execute is provided to a user and the user manually initiates the execution of the reversal function. In other embodiments, the system may automatically initiate the execution of the reversal function without any user interaction.

At operation 430, responsive to a determination to not reverse the generated software code, the system may be configured to automatically execute the generated software code including the destructive code in a runtime environment (e.g., a virtual machine, a virtual environment, etc.). In embodiments, automatically executing the generated software code may be performed in accordance with operation 340b of FIG. 3.

At operation 435, the system may be configured to determine whether running the generated software code including the destructive code results in a system error. In embodiments, success is indicated if the code runs without issues and produces the expected result. In embodiments, errors might arise from various factors, such as failed code execution, issues with environment variables (e.g., incorrect key-value pairs), missing dependencies, incorrect file paths, or unintended interactions with system resources. In embodiments, determining whether running the generated software code including the destructive code results in a system error may be performed in accordance with operations 345 and 350 of FIG. 3.

At operation 440, responsive to detecting a system error, the system may be optionally configured to retrain the LLM based on the generated software code and the associated system error. In embodiments, retraining the LLM may further comprise providing the software code, the error(s), and/or potential solutions for fixing or improving the software code back to the LLM as at least a portion of an LLM prompt, in accordance with operation 325. As provided above, by providing the software code, the error(s), and/or potential solutions for fixing or improving the software code back to the LLM, this allows the LLM to analyze and potentially correct the issue(s) causing the error(s). In embodiments, retraining the LLM may be performed in accordance with operations 350, 355, and 325 of FIG. 3. In embodiments, the system may optionally revert to operation 410 to generate software code based on the user-defined inputs using the retrained LLM. In other words, the system may optionally revert to operation 410 to generate software code based on the previously failed software code, the error(s), and/or potential solutions for fixing or improving the software code. In embodiments, the generated software code, associated system error, and/or code generated by the retrained LLM can be used for error handling and recovery, alternative code paths based on specific conditions, and/or further optimization and refinement of the initial code. Using the generated software code, associated system error, and/or code generated by the retrained LLM in this manner allows for a dynamic and iterative approach to code execution, enhancing the flexibility and adaptability of the LLM model.

At operation 445, the system may be configured to execute the generated software code. In embodiments, executing the generated software code results in a real-world result. For example, if the LLM generated software code as generated for a specific platform to automatically send personalized marketing emails, text(s), or notification(s) to specific unique customers, upon a successful completion of the LLM software code generation, code security server 205 may automatically execute the software code to send the personalized marketing emails, text(s), or notification(s). In other examples, if the LLM generated software code as generated for a specific platform to automatically accept payments on an ecommerce platform, the generated software code may be deployed in a manner such that a user can interact with the software code to transmit a payment transaction.

In embodiments, any operation of FIG. 4 may be performed at the same time as any one or more of the other operations illustrated in FIG. 4. For example, a first LLM generated software code may be analyzed at operation 415 while the trained LLM is generating a second LLM generated software code at operation 410. In other words, multiple processes may operate in parallel using the resources that are available.

In embodiments, a service provider could offer to perform the processes described herein. In this case, the service provider can create, maintain, deploy, support, etc., the computer infrastructure that performs the process steps of aspects of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, aspects of the present invention provide a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system may include one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
training, by a processor set, a large language model (LLM) on a plurality of programming languages to recognize common coding patterns;
generating, by the processor set using the trained LLM, software code based on user-defined inputs;

20 analyzing, by the processor set, the generated software code to identify destructive code;
determining, by the processor set, a reversal of the generated software code from a current state to a previous state is required based on the destructive code;
responsive to the determining that the reversal is required:
running, by the processor set, the generated software code comprising the destructive code in a controlled and isolated environment; and
providing, by the processor set, a user with a reversal function, that when executed by the user, causes the generated software code to revert from the current state to the previous state; and
responsive to a determination that running the generated software code comprising the destructive code does not result in a system error, executing, by the processor set, the generated software code.

2. The computer-implemented method of claim 1, further comprising:
determining, by the processor set, that running the generated software code comprising the destructive code results in a system error; and
responsive to detecting the system error, retraining the LLM based on the generated software code including the destructive code and an associated system error.

3. The computer-implemented method of claim 2, further comprising regenerating the software code based on the user-defined inputs using the retrained LLM.

4. The computer-implemented method of claim 1, further comprising determining a risk score for the destructive code;
responsive to the risk score exceeding a predetermined threshold, rejecting the generated software code; and
responsive to rejecting the software code, generating a second software code based on factors used to determine the risk score and based on the user-defined inputs.

5. The computer-implemented method of claim 1, wherein determining the reversal of the generated software code from the current state to the previous state is required is further based on an identified risk level associated with executing the generated code including the destructive code in a runtime environment.

6. The computer-implemented method of claim 1, further comprising configuring the LLM based on the user-defined inputs, wherein the user-defined inputs comprise reserved keywords, constraints, and known vulnerabilities.

7. The computer-implemented method of claim 6, wherein the common coding patterns comprise loops, conditional statements, and function declarations.

8. A computer program product comprising:
one or more computer-readable storage media; and
program instructions stored on the one or more computer-readable storage media to perform operations comprising:
training a large language model (LLM) on a plurality of programming languages to recognize common coding patterns;
generating, using the trained LLM, software code based on user-defined inputs;
analyzing the generated software code to identify destructive code;
determining a reversal of the generated software code from a current state to a previous state is required based on the destructive code;

responsive to the determining that the reversal is required:

running the generated software code comprising the destructive code in a controlled and isolated environment; and providing a user with a reversal function, that when executed by the user, causes the generated software code to revert from the current state to the previous state; and responsive to a determination that running the generated software code comprising the destructive code does not result in a system error, executing the generated software code.

9. The computer program product of claim 8, wherein the operations further comprise:

determining that running the generated software code comprising the destructive code results in a system error; and responsive to detecting the system error, retraining the LLM based on the generated software code including the destructive code and an associated system error.

10. The computer program product of claim 9, wherein the operations further comprise regenerating the software code based on the user-defined inputs using the retrained LLM.

11. The computer program product of claim 8, wherein the operations further comprise:

determining a risk score for the destructive code;

responsive to the risk score exceeding a predetermined threshold, rejecting the generated software code; and responsive to rejecting the software code, generating a second software code based on factors used to determine the risk score and based on the user-defined inputs.

12. The computer program product of claim 8, wherein determining the reversal of the generated software code from the current state to the previous state is required is further based on an identified risk level associated with executing the generated code including the destructive code in a runtime environment.

13. The computer program product of claim 8, wherein the operations further comprise configuring the LLM based on the user-defined inputs, wherein the user-defined inputs comprise reserved keywords, constraints, and known vulnerabilities.

14. The computer program product of claim 13, wherein the common coding patterns comprise loops, conditional statements, and function declarations.

15. A computer system comprising:
a processor set;
one or more computer-readable storage media; and
program instructions stored on the one or more computer-readable storage media to cause the processor set to perform operations comprising:

training a large language model (LLM) on a plurality of programming languages to recognize common coding patterns;

generating, using the trained LLM, software code based on user-defined inputs;

analyzing, the generated software code to identify destructive code;

determining a reversal of the generated software code from a current state to a previous state is not required based on the destructive code;

responsive to the determining that the reversal is required:

running the generated software code comprising the destructive code in a controlled and isolated environment; and providing a user with a reversal function, that when executed by the user, causes the generated software code to revert from the current state to the previous state; and responsive to a determination that running the generated software code comprising the destructive code does not result in a system error, executing the generated software code.

16. The computer system of claim 15, wherein the operations further comprise:

determining, by the processor set, that running the generated software code comprising the destructive code results in a system error; and responsive to detecting the system error, retraining the LLM based on the generated software code including the destructive code and an associated system error.

17. The computer system of claim 16, wherein the operations further comprise regenerating the software code based on the user-defined inputs using the retrained LLM.

18. The computer system of claim 15, wherein determining a reversal of the generated software code from the current state to the previous state is required is further based on an identified risk level associated with executing the generated code including the destructive code in a runtime environment.

19. The computer system of claim 18, wherein the operations further comprise configuring the LLM based on the user-defined inputs, wherein the user-defined inputs comprise reserved keywords, constraints, and known vulnerabilities.

20. The computer system of claim 19, wherein the common coding patterns comprise loops, conditional statements, and function declarations.

* * * * *